(12) United States Patent
Cho

(10) Patent No.: US 8,144,433 B2
(45) Date of Patent: Mar. 27, 2012

(54) HARD DISK DRIVE

(75) Inventor: Kyoung Man Cho, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 604 days.

(21) Appl. No.: 12/351,141

(22) Filed: Jan. 9, 2009

(65) Prior Publication Data

US 2009/0180211 A1    Jul. 16, 2009

(30) Foreign Application Priority Data

Jan. 11, 2008 (KR) .................. 10-2008-0003636

(51) Int. Cl.
G11B 21/08 (2006.01)

(52) U.S. Cl. ............ 360/265.1; 360/75; 360/265.6

(58) Field of Classification Search ......... 360/265.1, 360/265.6, 256, 256.4, 75
See application file for complete search history.

(56) References Cited

U.S. PATENT DOCUMENTS

| | | | |
|---|---|---|---|
| 5,187,627 A | 2/1993 | Hickox et al. | |
| 5,365,389 A | 11/1994 | Jabbari et al. | |
| 5,369,538 A | 11/1994 | Moe et al. | |
| 5,864,449 A | 1/1999 | Dominguez, Jr. et al. | |
| 6,130,803 A * | 10/2000 | Matsumura | 360/256.2 |
| 6,134,086 A * | 10/2000 | Kim | 360/256 |
| 6,198,603 B1 * | 3/2001 | West | 360/256 |
| 6,609,766 B1 * | 8/2003 | Chesnut | 303/7 |
| 2005/0057857 A1 | 3/2005 | Kawakami et al. | |

FOREIGN PATENT DOCUMENTS

| | | |
|---|---|---|
| JP | 06-223515 | 8/1994 |
| JP | 09-198812 | 7/1997 |
| JP | 10-320937 | 12/1998 |
| JP | 2005-267717 | 9/2005 |

OTHER PUBLICATIONS

European Search Report issued Apr. 8, 2009 in EP Application No. 09150127.0.

* cited by examiner

*Primary Examiner* — Gene Auduong
(74) *Attorney, Agent, or Firm* — Stanzione & Kim, LLP

(57) ABSTRACT

A hard disk drive including an actuator arm to pivot across a disk and having a read/write head disposed at an end of the actuator arm to read data from the disk and to write data to the disk, and a crash stop to prevent the read/write head from being pivoted beyond a preset outermost position of the disk. The crash stop can include a housing coupled to a base of the disk drive and disposed adjacent to an outer circumference of the disk, and a buffer member forcibly coupled to the housing. A coupling groove can be provided on one of the housing and the buffer member and a coupling protrusion can be provided on the other one of the housing and the buffer member to precisely locate the read/write head at the preset outermost position of the disk when the actuator arm contacts the crash stop.

23 Claims, 9 Drawing Sheets

HARD DISK DRIVE

CROSS-REFERENCE TO RELATED APPLICATIONS

This application claims priority under 35 U.S.C. §119 to Korean Patent Application No. 10-2008-0003636, filed on 11 Jan. 2008, in the Korean Intellectual Property Office, the disclosure of which is incorporated herein by reference in its entirety.

BACKGROUND OF THE INVENTION

1. Field of the Invention

The present general inventive concept relates to a hard disk drive, and more particularly, to a hard disk drive which can precisely and reliably read and write data by locating a read/write head at a preset outermost position of a disk when an actuator arm contacts a crash stop.

2. Description of the Related Art

Hard disk drives (HDDs) are devices to record data on a disk or reproduce data stored on the disk by using a read/write head. The HDDs are widely used as auxiliary memory devices of computer systems because of their fast access time to a large amount of data.

With the recent increase in TPI (tracks per inch) and BPI (bits per inch), the HDD has achieved a high capacity and its application field has expanded. Accordingly, there has been a request for development of compact HDDs which can be used for portable electronic products such as laptops, personal digital assistants (PDAs), and mobile phones. In addition to 2.5" HDDs, compact HDDs having a diameter of about 0.8 inches (e.g., similar to a coin) have been actively developed and are expected to be used for mobile phones or MP3 players.

FIG. 1 is an enlarged perspective view of a portion of a conventional HDD 101 having a crash stop 170 installed thereto. FIG. 2 illustrates a defective shape of the crash stop that may occur during the manufacturing and/or installation of the crash stop of FIG. 1. FIG. 3 is a plan view illustrating a positional change that occurs when an actuator arm contacts the crash stop having the defective shape illustrated in FIG. 2.

Referring to FIG. 1, a conventional HDD 101 includes a disk pack 110 having a disk 111 for recording data, a head stack assembly (HSA) 140 having an actuator arm 143, where a read/write head 141 for recording data on the disk 111 and reproducing data from the disk 111 is installed at an end of the actuator arm 143, a voice coil motor (VCM) (not illustrated in FIG. 1) to pivot the head stack assembly 140, a printed circuit board assembly (not illustrated in FIG. 1), a crash stop 170 to inhibit the read/write head 141 from deviating from the outermost position of the disk 111, a base 160 on which the above elements are installed, and a cover (not illustrated in FIG. 1) to protect the components installed on the base 160.

The HSA 140 pivots around a pivot shaft 142 according to a driving force by the VCM. The HSA 140 includes the read/write head 141, the actuator arm 143 which pivots across the disk 111 about the central axis of the pivot shaft 142 so that the read/write head 141 can access data on the disk 111, a pivot shaft holder 144 to rotatably support the pivot shaft 142 and to which the actuator arm 143 is coupled and supported, and a bobbin (not illustrated) provided at the opposite side of the actuator arm 144 with respect to the pivot shaft holder 144 which is integrally formed with the actuator arm 143.

The rotation of the actuator arm 143 about the pivot shaft 142 enables the read/write head 141 to move to a predetermined position of the disk 111. In doing so, in order to prevent the read/write head 141 from being pivoted beyond the outermost position of the disk 111, a crash stop 170 is provided on the upper surface of the base 160. The conventional crash stop 170 illustrated in FIGS. 1 and 2 includes a housing 180 having a round column 183 in the upper portion thereof and a rubber ring 190 having a ring shape that is forcibly and detachably coupled to the round column 183 of the housing 180. With this configuration, the crash stop 170 can be easily manufactured by simply inserting the rubber ring 190 around the round column 183 of the housing 180.

However, in the conventional crash stop 170 of FIG. 2, the round column 183 of the housing 180 is substantially not perpendicular and may be leaning toward one side. Also, the rubber ring 190 may not be formed to have a uniform wall thickness so that a part of the rubber ring 190 is thicker than an other part thereof. Here, when the rubber ring 190 is coupled to the defectively shaped round column 183 of the housing 180 as illustrated in FIG. 3, a distance d2 from a side of a contact protrusion 143a of the actuator arm 143 to an imaginary center point of the crash stop 170 may be different from a preset distance d1. Thus, not only is the pivot radius of the actuator arm 143 changed, but also the read/write head 141 which is installed at an end portion of the actuator arm 143 may be deviated from the preset outermost position of the disk 111. As a result, the read/write head 141 may not be able to precisely and reliably read and write data.

SUMMARY OF THE INVENTION

The present general inventive concept provides an hard disk drive (HDD) including a crash stop having a relatively simple and precise structure wherein the actuator arm can pivot within a predetermined pivot radius, and wherein the read/write head can be precisely located at a preset outermost position of the disk when the actuator arm contacts the crash stop to reliably read and write data.

Additional and/or other aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an HDD including an actuator arm to pivot across a disk about a pivot shaft and having a read/write head disposed at an end portion of the actuator arm to read data from the disk and to write data to the disk, and a crash stop to prevent the read/write head from being pivoted beyond an outermost position of the disk, the crash stop including a housing coupled to a base of the disk drive and disposed adjacent to an outer circumference of the disk, and a buffer member formed of an elastic material and forcibly coupled to the housing, wherein a coupling groove is provided on one of the housing and the buffer member and a coupling protrusion is provided on the other one of the housing and the buffer member, and wherein the coupling protrusion is forcibly coupled to the coupling groove.

The coupling groove can be provided on the housing and the coupling protrusion can be provided on the buffer member.

The housing may include a housing main body, a housing shaft protruding from a lower portion of the housing main body and coupled to a groove formed on the base, and a coupling body extending from an upper portion of the housing main body and having the coupling groove to forcibly couple the buffer member to the coupling body such that a part of the buffer member is exposed from the coupling body toward the actuator arm.

An opening portion which opens toward the actuator arm can be provided at the coupling body and an escape prevention portion to prevent escape of the buffer member can be provided at both end portions of the opening portion.

The buffer member can be formed of rubber.

The buffer member can include a coupling rubber portion forcibly coupled to the coupling groove of the coupling body, and a contact rubber portion extending from the coupling rubber portion to be exposed through the opening portion of the coupling body to contact the actuator arm and to prevent the read/write head from being pivoted beyond the outermost position of the disk.

The contact rubber portion can include a substantially semi-circular shape.

The housing and the buffer member can be forcibly coupled to each other so that the center of the housing shaft and the center of an imaginary circle of the contact rubber portion are substantially matched with each other.

The buffer member can be integrally formed by injection molding.

The housing can be integrally formed of a plastic material by injection molding.

A contact protrusion may protrude from a side surface of the actuator arm facing the crash stop to prevent the read/write head from being deviated from a preset position of the disk when the contact protrusion contacts the buffer member.

The hard disk drive may further include a board mounting plate coupled to the base, and a flexible printed circuit board installed on the board mounting plate and electrically connected to the read/write head, wherein the crash stop can be integrally formed with the board mounting plate at a side of the board mounting plate adjacent to the outer circumference of the disk.

The foregoing and/or other aspects and utilities of the present general inventive concept may also be achieved by a crash stop assembly usable with a hard disk drive to stop an actuator arm with respect to a disk therein, the crash stop assembly including a coupling member having an opening portion facing the actuator arm, and a buffer member having a coupling portion installed within the opening portion and a contact portion extending away from the opening portion to stop the actuator arm at a predetermined location with respect to the disk when the actuator arm contacts the buffer member.

The actuator arm may include a read/write head positioned at a predetermined location with respect to an outer circumference of the disk when the actuator arm contacts the buffer member.

The crash stop assembly may further include a housing member connected to the coupling member, and a housing shaft extending from a lower portion of the housing member to couple the housing member to a base of the hard disk drive, wherein a longitudinal center of the housing shaft substantially matches a longitudinal center of the buffer member when the housing member is coupled to the base.

The coupling member may be formed into a substantially U-shape to define the opening therein, the coupling member comprising an escape prevention portion extending from both ends of the U to at least partially enclose the coupling portion within the opening portion.

The foregoing and/or other aspects and utilities of the present general inventive concept may also be achieved by an electronic device including a processing unit to process data and a hard disk drive (HDD) connected to the processing unit to read and/or write the data, the HDD including a crash stop assembly to stop an actuator arm of the HDD with respect to a disk therein, the crash stop assembly including a coupling member having an opening portion facing the actuator arm, and a buffer member having a coupling portion installed within the opening portion and a contact portion extending away from the opening portion to stop the actuator arm at a predetermined location with respect to the disk when the actuator arm contacts the buffer member.

BRIEF DESCRIPTION OF THE DRAWINGS

These and/or other aspects and utilities of the present general inventive concept will become apparent and more readily appreciated from the following detailed description, taken in conjunction with the accompanying drawings of which.

DETAILED DESCRIPTION OF THE PREFERRED EMBODIMENTS

Figure 1:
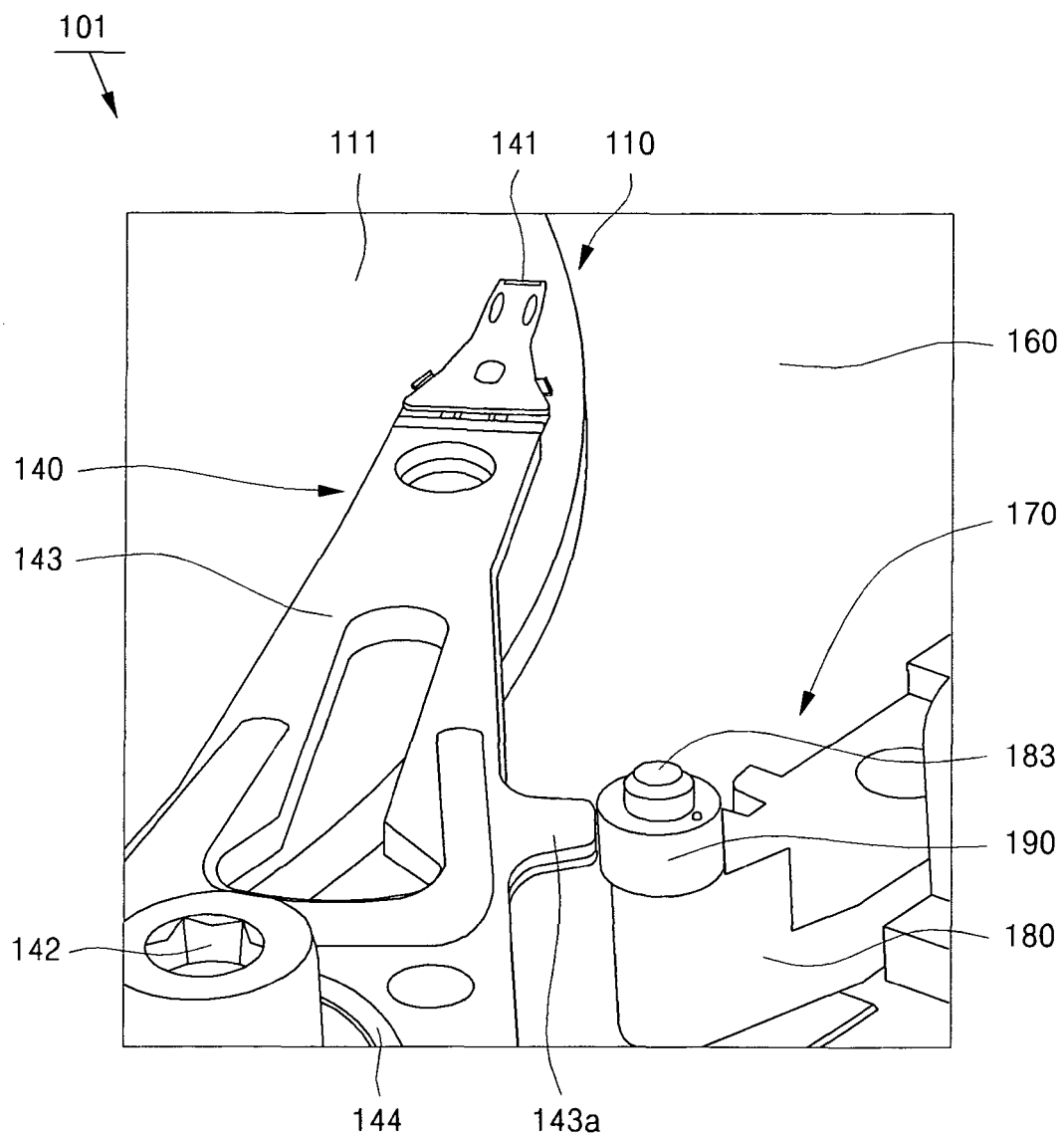
FIG. 1 is an enlarged perspective view of a portion of a conventional HDD where a crash stop is installed.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Referring to FIGS. 4-7, an HDD according to an embodiment of the present general inventive concept can include a disk pack 10, a printed circuit board assembly (PCBA) 20, a voice coil motor 30, a cover 50, a base 60 coupled to the cover 50, a head stack assembly (HSA) 40 having an actuator arm 43 in which a read/write head 41 is installed at an end portion thereof, and a crash stop 70 installed on the base 60 to prevent the actuator arm 43 from pivoting out of a preset pivot radius, and to determine the position of the read/write head 41 at the outermost position of a disk 11. Although embodiments of the present general inventive concept will be described in terms of a singular disk 111 for convenience of description, those skilled in the art will appreciate that a plurality of disks 11 may be employed without departing from the scope and principles of the present general inventive concept.

Figure 4:
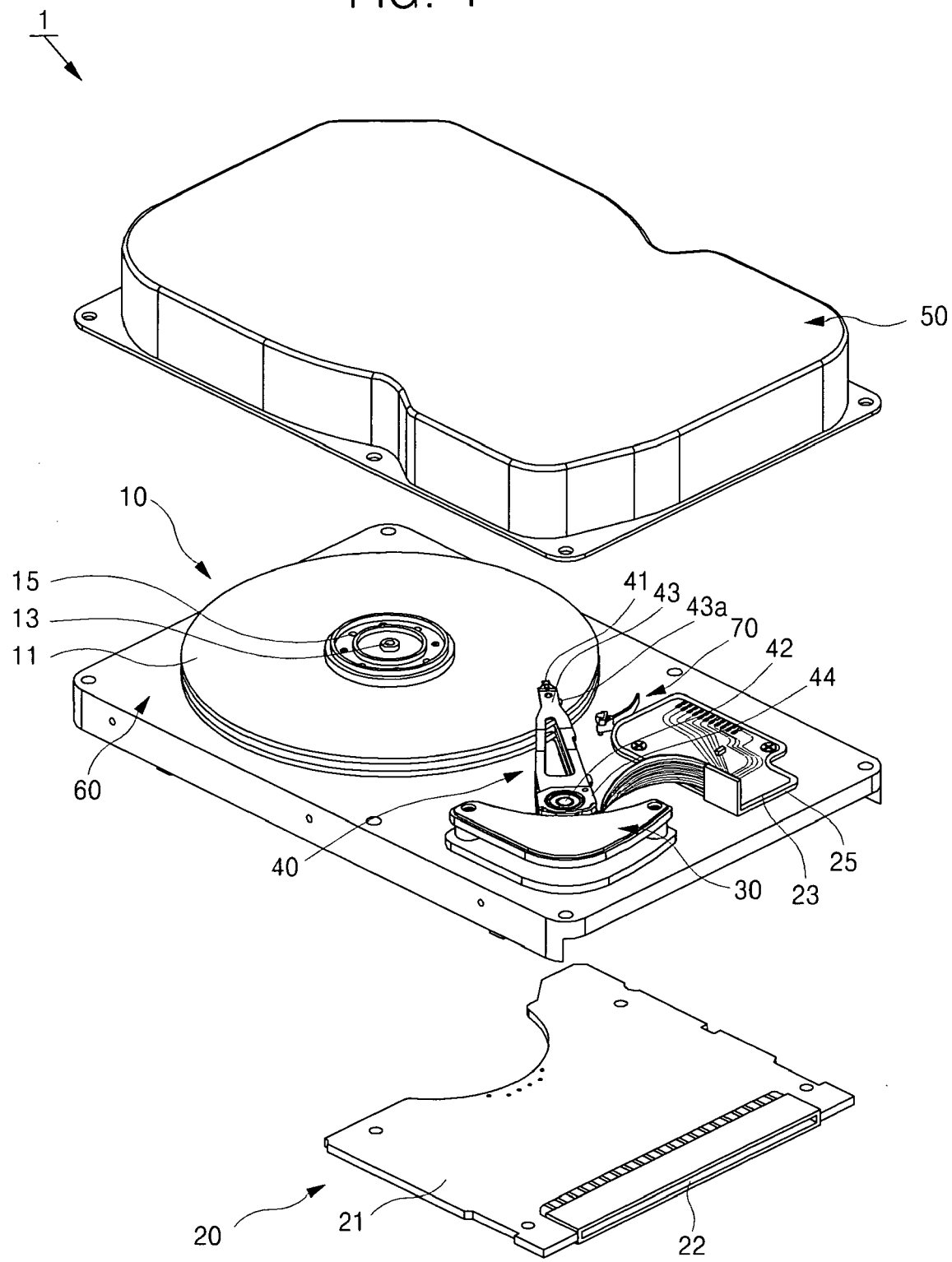
FIG. 4 is an exploded perspective view of an HDD according to an embodiment of the present general inventive concept.

As illustrated in FIG. 4, the above-identified constituent elements can be installed on the base 60, and the cover 50 can be coupled to the base 60 to protect the constituent elements installed on the base 60.

The disk pack 10 can include the disk 11 arranged perpendicularly, a shaft 13 to form a rotational center of the disk 11, a spindle motor hub (not illustrated) provided radially outside the shaft 13 to support the disk 11, a spindle motor (not illustrated) to rotate the spindle motor hub, a clamp 15 coupled to an upper portion of the spindle motor hub, and a clamp screw (not illustrated) pressing against the clamp 15 to fix the disk 11 to the spindle motor hub.

As the overall size of the HDD decreases, disks having sizes from about 0.85 inches to 3.5 inches are typically being manufactured. For example, the 0.85" disks can be employed with compact HDD for use with MP3 players, while the 3.5" disks can be employed with compact HDD for use with desktop computers. The disk 11 can include a plurality of tracks formed in a circumferential direction and a plurality of sectors partitioning each track in a radial direction in a manner known in the art. As the size of the disk 11 decreases, the sizes of the tracks and the sectors are gradually decreased. Accordingly, the operation of the read/write head 41 that reads data from each sector and/or writes data to each sector by approaching the sector must be very precisely controlled.

The PCBA 20 can include a printed circuit board (PCB) 21 having a plate shape and coupled to a rear surface of the base 60. A flexible printed circuit board (FPCB) 23 can be installed on an upper surface of the base 60 adjacent to the HSA 40 and electrically connecting the HSA 40 and the PCB 21, and a PCB connector 22 can be provided at one side of the PCB 21.

A plurality of chips and circuits (not illustrated) to control the HSA 40 and the VCM 30 can be provided on the PCB 21 and can transceive external signals via the PCB connector 22. The FPCB 23 can be connected to the base 60 by being installed on a board mounting plate 25 having a similar shape to that of the FPCB 23 and coupled to the base 60. The crash stop 70 can be integrally provided on the board mounting plate 25 located adjacent to the disk 11, as described in more detail hereinafter below.

Figure 5:
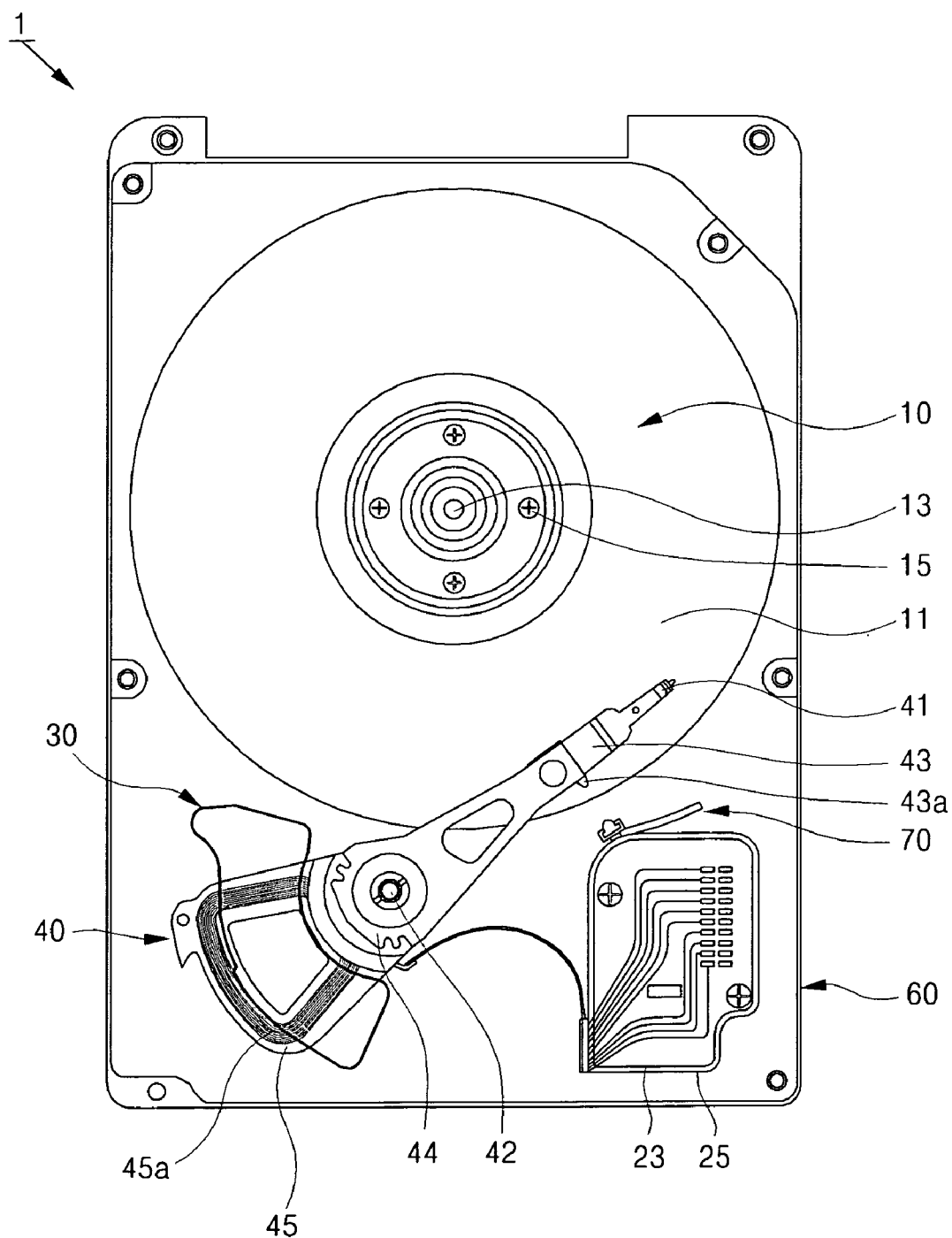
FIG. 5 is a plan view of the HDD of FIG. 4.

As illustrated in FIGS. 4 and 5, the VCM 30 can serve as a drive motor to pivot the actuator arm 43 and to move the read/write head 41 to a desired position on the disks 11 using the Fleming's left hand rule. That is, when current flows in a conductive body existing in a magnetic field, an electromagnetic force is generated. As current is supplied to a voice coil 45a between magnets (not illustrated), a force is applied to a bobbin 45 so that the bobbin 45 pivots. Accordingly, since the actuator arm 43 of the HSA 40 can pivot in a predetermined direction, the read/write head 41 which is installed at an end portion of the actuator arm 43 can search the tracks and access data while moving in a radial direction of the disk 11 that is rotating. Thus, data can be recorded on the disk 11 or reproduced from the disk 11 at predetermined locations using the read/write head.

Figure 6:
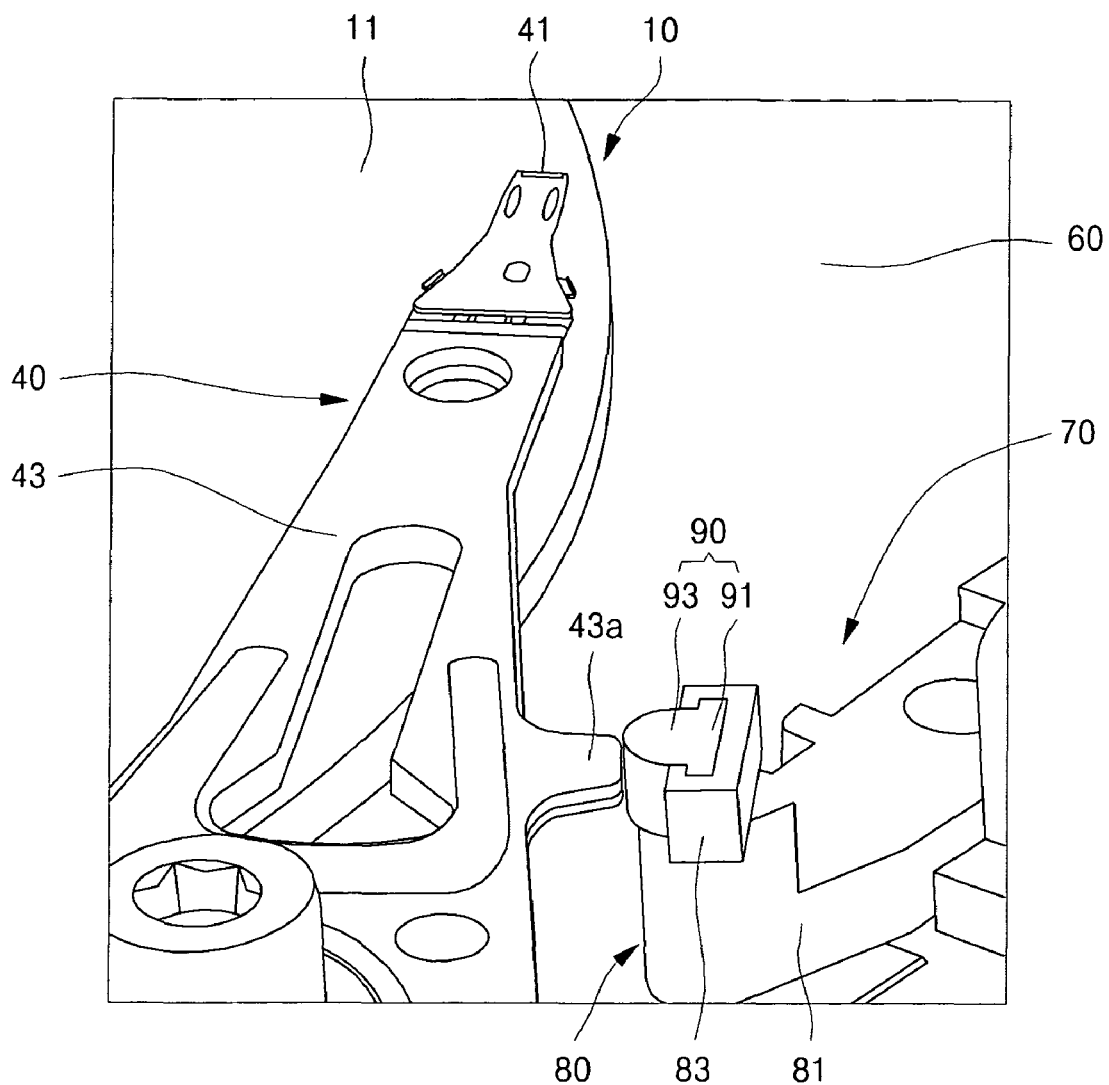
FIG. 6 is an enlarged perspective view of a portion of the HDD of FIG. 4 where the crash stop is installed.

Referring to FIGS. 4 to 6, the HSA 40 can serve as a carrier to record data on the disk 11 or to reproduce the data from the disk 11. The HSA 40 can include the read/write head 41 to write data to the disk 11 or to read the recorded data, the actuator arm 43 which pivots across the disk 11 about the central axis of the pivot shaft 42 to allow the read/write head 41 to access the data on the disk 11, a pivot shaft holder 44 to rotatably support the pivot shaft 42 and to which the actuator arm 43 is coupled, and a bobbin 45 which is integrally provided with the actuator arm 43 at the opposite side of the actuator arm 43 with respect to the pivot shaft holder 44.

To prevent the read/write head 41 from being pivoted beyond the outermost position of the disk 11, a contact protrusion 43a to contact the crash stop 70 may be configured to protrude from a side portion of the actuator arm 43, as illustrated in FIG. 6. When the contact protrusion 43a contacts the crash stop 70, the position of the read/write head 41 at the outermost position of the disk 11 can be stably determined.

The read/write head 41 can read or write information with respect to the rotating disk 11 by detecting a magnetic field formed on the surface of the disk 11. To record and reproduce data, the read/write head 41 can include a read head to detect the magnetic field of the disk 11 and a write head to magnetize the disk 11.

Figure 2:
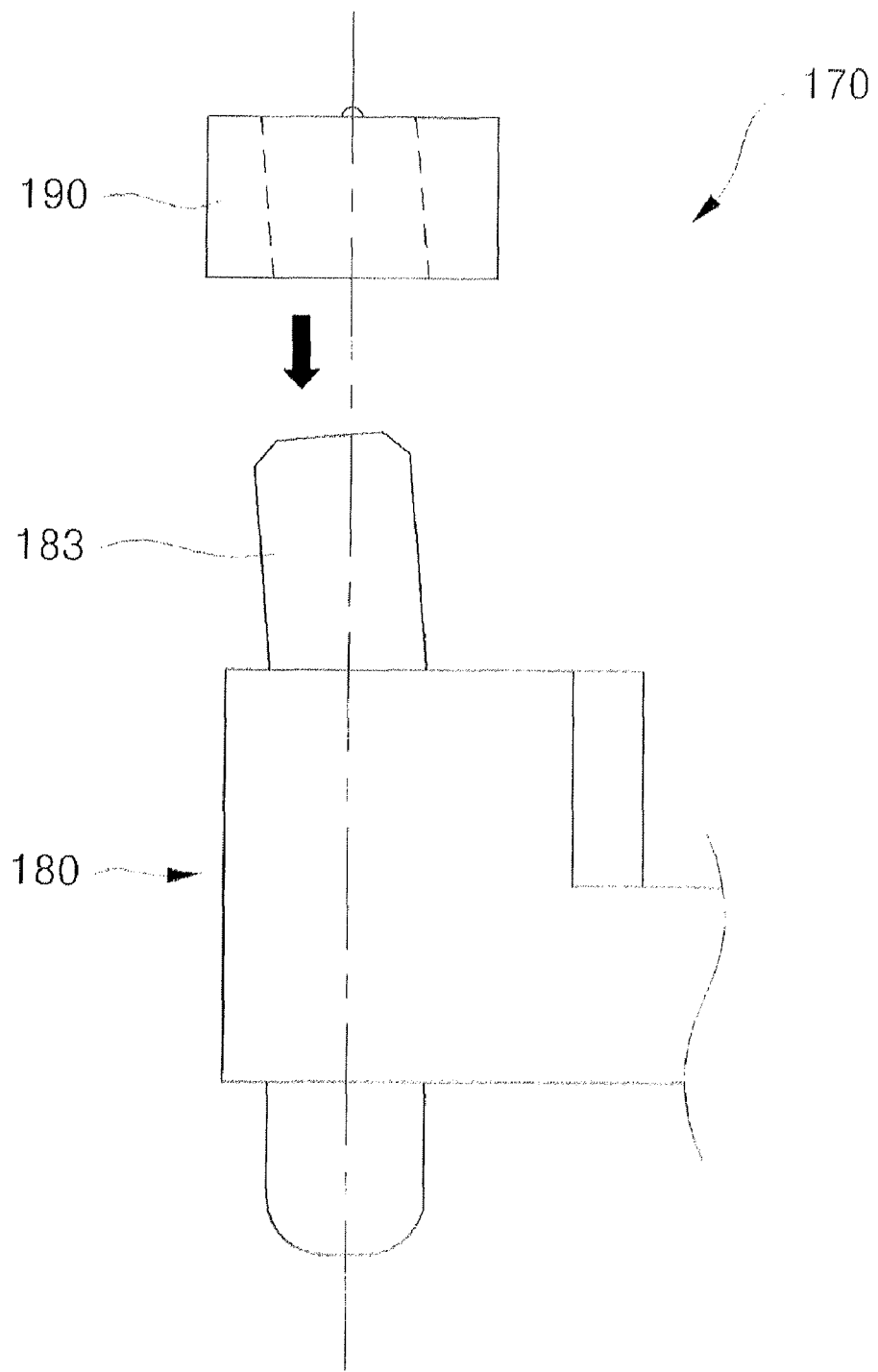
FIG. 2 illustrates the shape of the crash stop that may occur during the manufacturing of the crash stop of FIG. 1.
Figure 3:
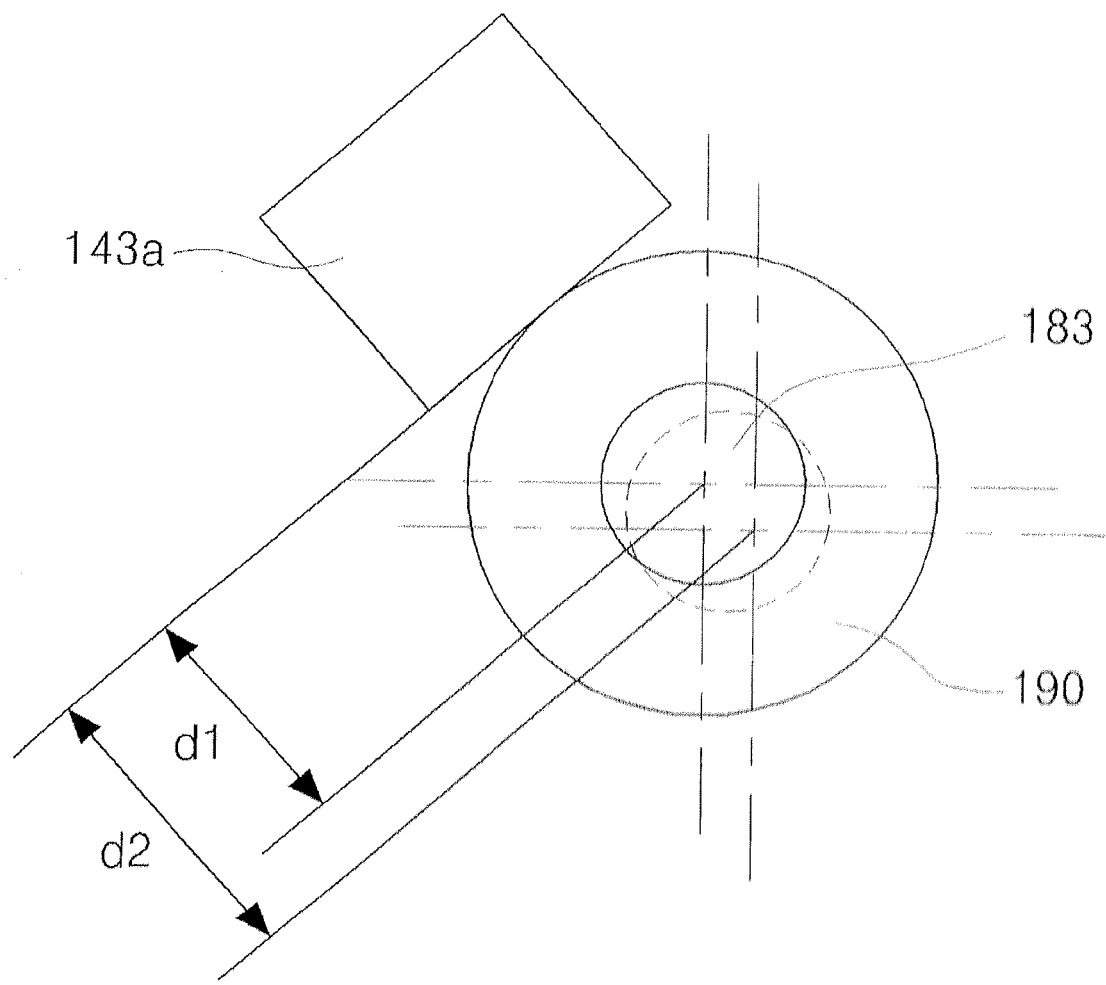
FIG. 3 is a plan view illustrating a positional change occurring when the actuator arm contacts the crash stop having a defective shape as illustrated in FIG. 2.

The crash stop 70 can be configured to prevent the actuator arm 43 from pivoting beyond a set pivot radius. That is, the read/write head 41, which is installed at an end portion of the actuator arm 43, can be prevented from being deviated from a preset outermost position of the disk 11. However, as described above, the conventional crash stop 170 of FIGS. 1-3 is installed on the base 160 adjacent to the outer circumference of the disk 111 to prevent pivoting of the actuator arm 143. However, when the housing 180 which forms the crash stop 170 and the rubber ring 190 which is coupled to the housing 180 are not precisely manufactured, that is, when the defective shapes of the housing 180 and the rubber ring 190 or a defect due to error in assembly tolerance therebetween is generated, a change is generated in the position of the read/write head when the actuator arm 143 contacts the crash stop 170. That is, the crash stop 170 cannot be properly installed or cannot precisely maintain a location of an actuator arm 143. As a result, the reliability in the data recording and reproduction job by the read/write head 141 with respect to the disk 111 is deteriorated.

Referring back to FIGS. 4-7, the crash stop 70 of the present general inventive concept may be manufactured into a precise shape with minimal assembly tolerance during assembly. Accordingly, the position of the read/write head 41 at the outermost position of the disk 11 can be precisely maintained compared to the conventional technology so that the read/write head 41 can reliably perform the data recording and reproduction job. The structure of the crash stop 70 of the HDD 1 according to the present embodiment will be described below in detail.

Figure 7:
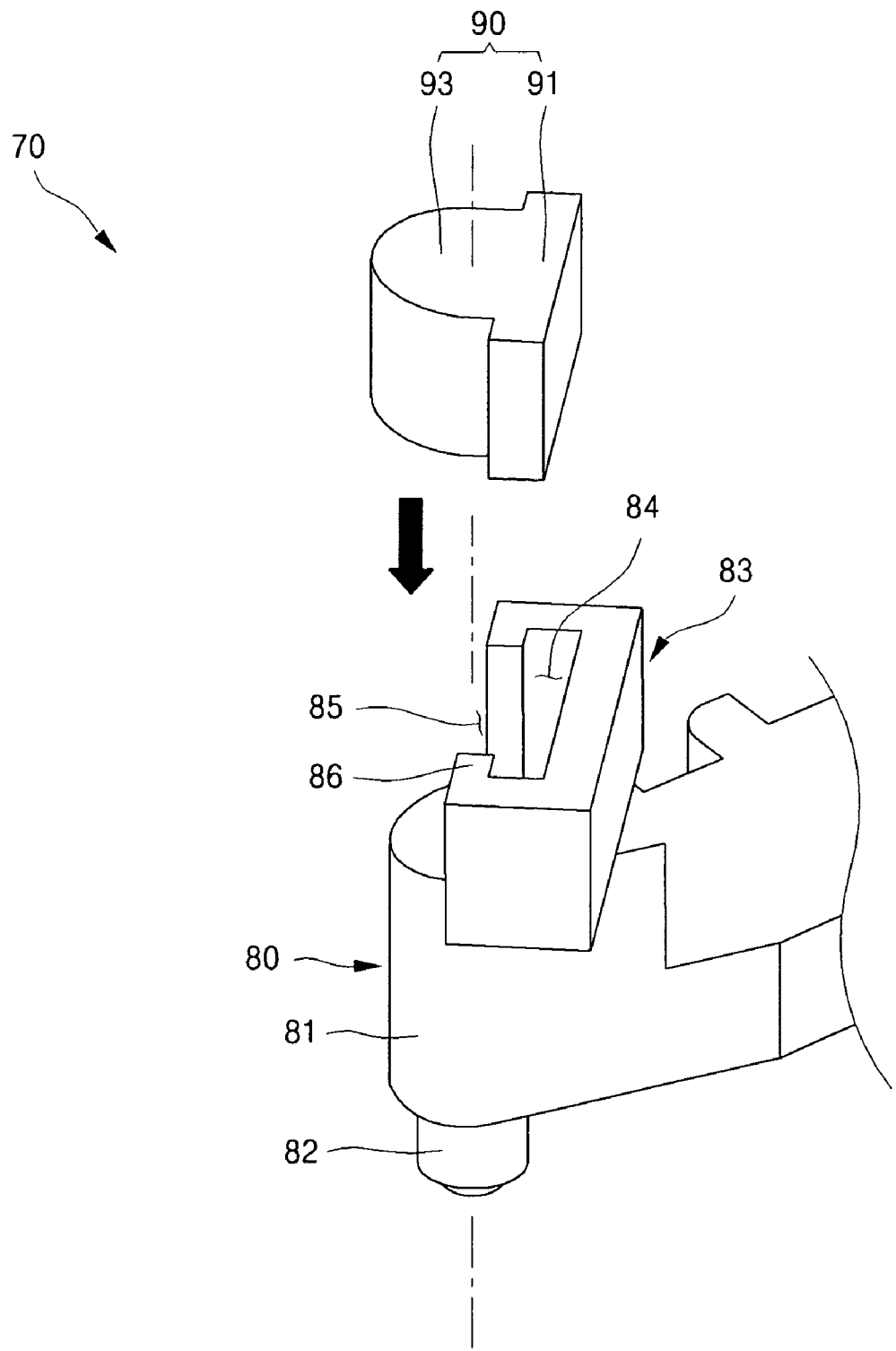
FIG. 7 is an exploded perspective view illustrating the structure of the crash stop of FIG. 6.

As illustrated in FIGS. 6 and 7, the crash stop 70 of the HDD 1 according to an embodiment of the present general inventive concept can include a housing 80 provided integrally with the above-described board mounting plate 25 and a buffer member 90 for example, a rubber member 90 formed of a rubber material and forcibly coupled to the housing 80 and contacting the contact protrusion 43a formed at a side portion of the actuator arm 43.

The housing 80 can include a housing main body 81 integrally formed with the board mounting plate 25, a housing shaft 82 having a circular cylindrical shape, protruding from a lower portion of the housing main body 81 and coupled to a groove formed in the base 60, and a coupling body 83 extending from an upper portion of the housing main body 81 to which the rubber member 90 can be forcibly coupled. However, in this embodiment, although the housing 80 and the board mounting plate 25 can be integrally formed, they may be separately manufactured and then mounted on the base 60. Moreover, since the housing 80 can be integrally manufactured by injection molding using a plastic material, the housing 80 can be easily manufactured.

It is possible that the housing 80 can be directly installed on the board mounting plate 25 without the housing shaft 82. It is also possible that the coupling body 83 can be installed on the board mounting plate 25 without the housing 80.

A sectional area of the coupling body 83 can be formed into a generally "U" or "∩" type shape, as illustrated in FIG. 7, although it is understood that many other shapes could also be used without departing from the principles of the present general inventive concept. The sectional area of 83 may be a horizontal sectional area parallel to a major surface the disk 10 and/or the movement of the actuator arm 43. As illustrated in FIG. 7, a forcibly coupling groove 84 to forcibly receive the rubber member 90 can be provided in the coupling body 83. Also, an opening portion 85 that is open toward the actuator arm 43 can be provided in the coupling body 83 so that when the rubber member 90 is forcibly coupled to the forcibly coupling groove 84, a part of the rubber member 90 facing the actuator arm 43 can be exposed so as to contact the contact protrusion 43a of the actuator arm 43. An escape prevention portion 86 can be formed on the coupling body 83 by being substantially perpendicularly bent from both end portions of the coupling body 83 to at least partially enclose the coupling portion 91 of the rubber member 90 and prevent the escape of the rubber member 90 after the rubber member 90 is forcibly coupled to the coupling body 83. This shape of the coupling body 83 enables the rubber member 90 to be firmly and forcibly coupled to the coupling body 83 so that assembly tolerance that may be generated during assembly can be minimized.

The buffer member 90, for example, the rubber member 90, can be formed of a rubber material so that when the contact protrusion 43a formed at the side portion of the actuator arm 43 contacts the buffer member 90, an impact by the contact protrusion 43a can be buffered. As illustrated in FIG. 7, in order for the rubber member 90 to be partially inserted in and forcibly coupled to the forcibly coupling groove 84, the rubber member 90 can include a coupling rubber portion 91 that is forcibly coupled to the forcibly coupling groove 84, and a contact rubber portion 93 provided integrally with the coupling rubber portion 91 to be exposed through the opening portion 85 and the coupling body 83 and directly contacting the contact protrusion 43a of the actuator arm 43 during pivoting of the actuator arm 43.

Figure 8:
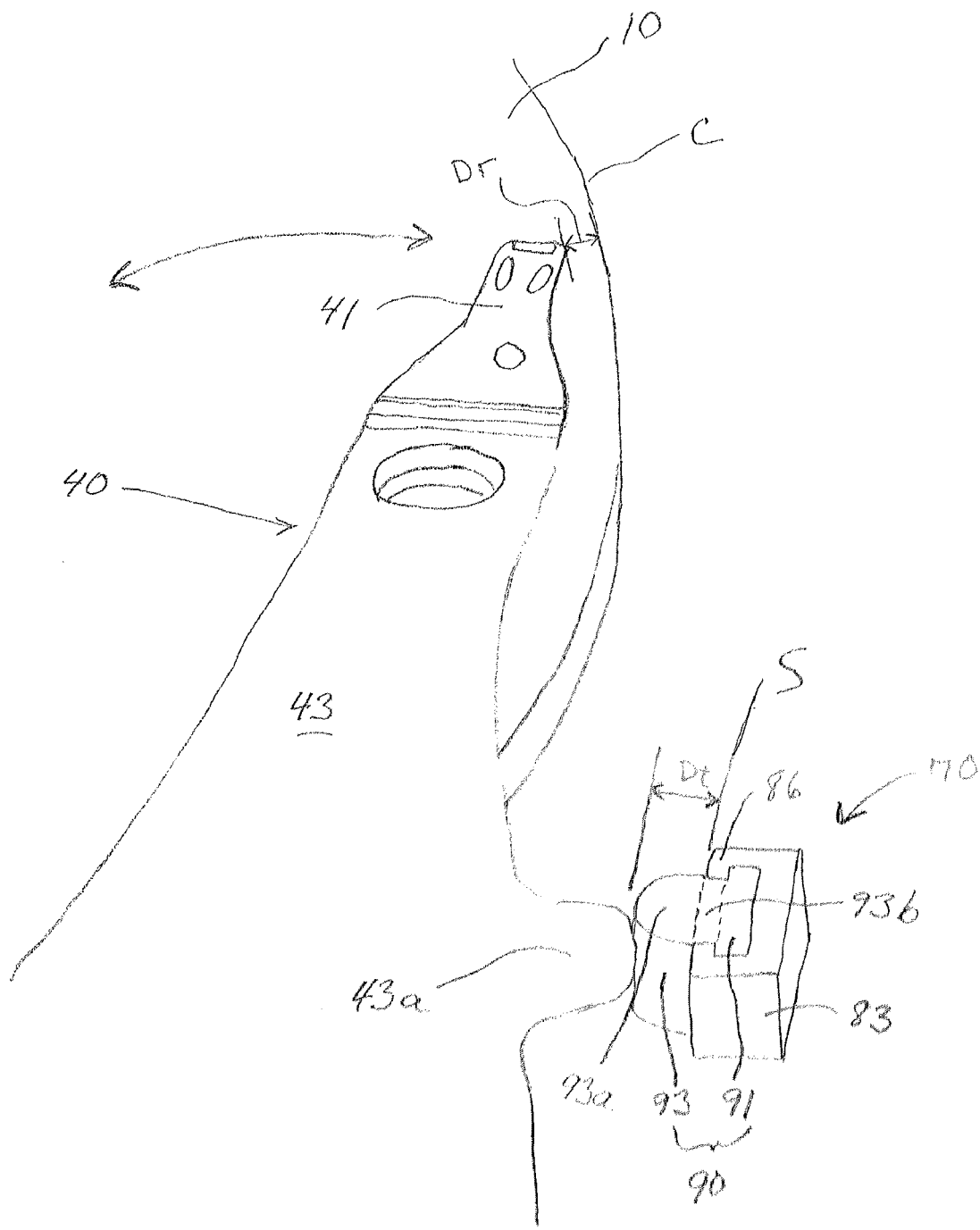
FIG. 8 is a perspective view to embody the HDD FIG. 6.

As illustrated in FIGS. 7 and 8, the coupling rubber portion 91 can be disposed inside an opening portion 85 of the coupling body 83, and the contact rubber portion 93 can include a protruding portion 93a extending from an exterior surface S of the coupling body 83 through the opening portion 85 toward the actuator arm 43 by a thickness Dt as illustrated in FIG. 8.

The contact rubber portion 93 can be provided in a semicircular shape to reduce the contact area with respect to the contact protrusion 43a and to improve a buffer effect during a collision with the actuator arm 43. The housing 80 and the rubber member 90 can be manufactured such that the longitudinal center of the housing shaft 82 substantially matches the longitudinal center of an imaginary circle of the contact rubber portion 93. This can minimize the contact area between the contact protrusion 43a of the actuator arm 43 and the rubber 90 when the contact protrusion 43a contacts the rubber 90 by allowing the contact protrusion 43a to contact a certain point on the contact protrusion 43a.

As described above, since the rubber member 90 can be integrally manufactured of a rubber material in an injection molding method to exhibit a superior buffer characteristic, the rubber member 90 can be easily manufactured. Also, unlike the conventional crash stop 170 illustrated in FIGS. 1 to 3, the crash stop 70 according to the present general inventive concept can prevent a change in the position of the read/write head 41 at the outermost position of the disk 11 and improve a work reliability of the read/write head 41.

That is, as described above, the conventional crash stop 170 has a structure in which the rubber ring 190 which contacts the actuator arm 143 is inserted around the round column 183 of the housing 180. However, defects may be generated when the round column 183 of the housing 180 and the rubber ring 190 coupled thereto are manufactured. In this case, when the defective rubber ring 190 and the defective housing 180 are assembled, or assembly tolerance is generated during the assembly of the housing 180 and the rubber ring 190, error may be generated in the pivot radius of the actuator arm 143. Accordingly, the read/write head 141 installed at the end portion of the actuator arm 143 may be deviated from the preset outermost position of the disk 111.

However, in the crash stop 70 of the present general inventive concept, as illustrated in FIGS. 6 and 7, the buffer member 90 can be forcibly coupled to the forcibly coupling groove 84 of the coupling body 83 of the housing 80. Accordingly, errors due to manufacturing defects and assembly tolerance can be reduced compared to the conventional technology. Accordingly, when the actuator arm 43 contacts the crash stop 70, since the read/write head 41 can be more precisely located at the preset outermost position of the disk 11 than that according to the conventional technology, the read/write head 40 can precisely perform a data recording and reproduction job with respect to the disk 11.

An operation of the HDD 1 of the present general inventive concept, and in particular, an operation of the crash stop 70 of the present general inventive concept, will be described below.

When power is on, the disk pack 10, the HSA 40, and the VCM 30 can be substantially simultaneously operated. That is, the disk 11 can be rotated in a direction by the spindle motor. The HSA 40 can be rotated in a predetermined direction by the interaction of the bobbin 45 and the magnet (not illustrated). As a result, the read/write head 41 can be located at a desired position on the disk 11 so as to record a predetermined data on the disk 11 or reproduce the data from the disk 11.

Since the disk 11 is divided into a large number of tracks and each track is divided into a large number of sectors, the read/write head 41 needs to be precisely located to access the track of the disk 11. When precise access to a target track is not made, reliable data recording and reproduction operations deteriorate.

In particular, since the crash stop 70 which is installed on the base 60 can prevent the actuator arm 43 from being deviated beyond a predetermined point, the read/write head 41 can be prevented from being deviated from the predetermined outermost position of the disk 11. However, in the conventional crash stop configuration, a change may be generated in the pivot radius of the actuator arm 43. Accordingly, the read/write head 41 which is installed at an end portion of the actuator arm 43 may be slightly deviated from the preset outermost position, which may substantially deteriorate the work reliability of the read/write head 41.

However, in the crash stop 70 according to the present general inventive concept, since the housing 80 and the buffer member 90 are embodied in a predetermined shape by injection molding and the buffer member 90 (for example, the rubber member 90) is forcibly coupled to the housing 80, the pivot radius of the actuator arm 43 can be maintained constant in spite of a repeated work environment. That is, when the contact protrusion 43a of the actuator arm 43 and the rubber member 90 of the crash stop 70 maintain a contact state, the read/write head 41 can be precisely located at the preset outermost position compared to the conventional technology. Thus, the read/write head 41 can perform a reliable data recording and reproduction job at the outermost position of the disk 11.

According to the present embodiment, since the rubber member 90 can be firmly and forcibly coupled to the housing 80, errors due to manufacturing defects and assembly tolerance can be reduced compared to the conventional technology so that the actuator arm 43 can pivot within a preset pivot radius. Accordingly, when the actuator arm 43 contacts the crash stop 70, the read/write head 41 can be located at the preset outermost position of the disk 11 so that a reliable data recording and reproduction job can be performed.

Although the forcibly coupling groove which forcibly couples the buffer member 90 to the housing 80 can be provided in the coupling body of the housing, and the forcibly coupling protrusion forcibly coupled to the forcibly coupling groove can be provided at the buffer member, it will be appreciated that the forcibly coupling protrusion may alternatively be provided at the coupling body and the forcibly coupling groove to which the forcibly coupling protrusion is forcibly coupled may be alternatively provided in the buffer member, to achieve the same or similar results. Also, although the buffer member can be configured as a rubber member formed of a rubber material, the buffer member can be manufactured of any material chosen with sound engineering judgment which is capable of buffering.

As illustrated in FIG. 8, the contact rubber portion 93 of the rubber member 90 can include a protruding portion 93a extending a predetermined distance Dt away from an exterior surface S of the coupling body 83 toward the actuator arm 43, and an inner portion 93b disposed inside the coupling body 83. The dimensions of the coupling body 83 and/or rubber member 90 can be configured in shape and size to precisely locate the read/write head 41 at a predetermined distance Dr in relation to a circumferential edge C of the disk 10 when the protruding portion 93a contacts the actuator arm 43 (or associated contact protrusion 43a). At least one of the distances Dr and Dt could be any value, greater or less than zero, including zero, chosen with sound engineering judgment, to locate the read/write head 41 at a predetermined position with respect to the disk 10. That is, the length Dt of the protruding portion 93a could be set in relation to Dr to locate the read/write head 41 at a predetermined position with respect to the disk 10 when the protruding portion 93a contacts the actuator arm 43. It is possible that the distance Dr is not greater than the distance Dt. However, the present general inventive concept is not limited thereto. Accordingly, the read/write head 41 can be precisely located at a predetermined position of the disk 10 according to a relation of Dr and Dt and chosen configuration of the HSA 40, disk 11, and crash stop 70.

Figure 9:
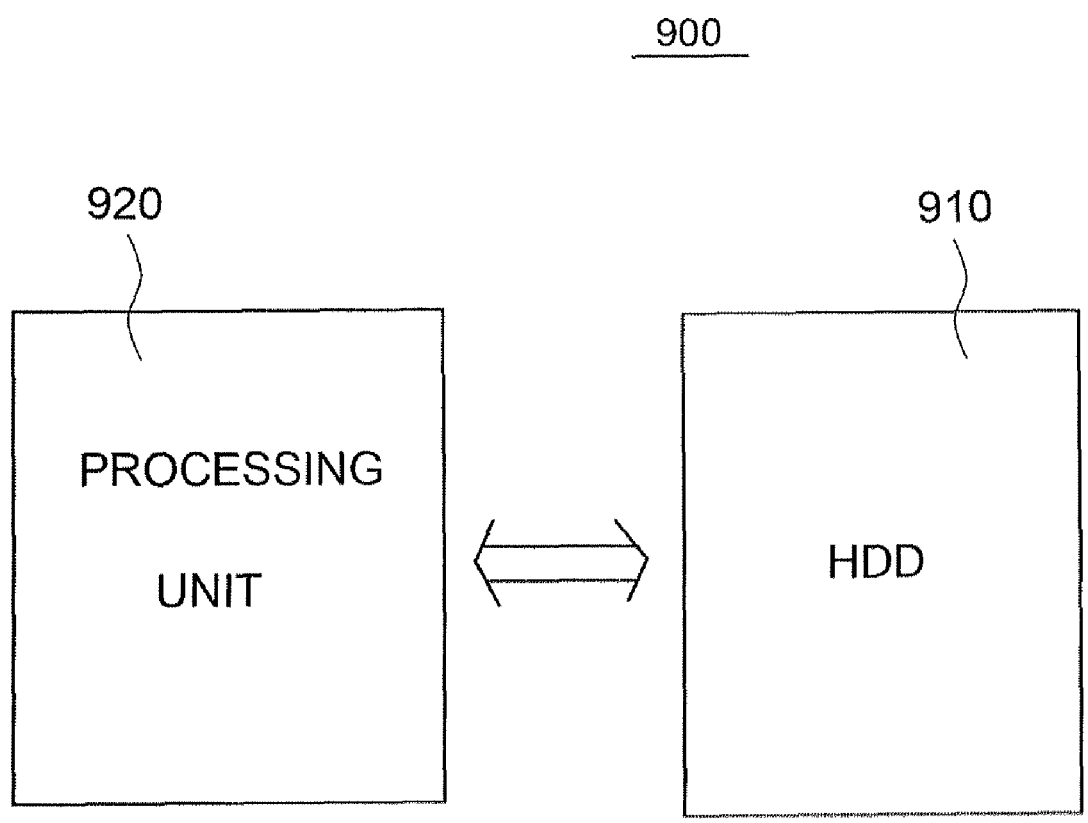
FIG. 9 illustrates an electronic device to an embodiment of the present general inventive concept.

FIG. 9 illustrates an electronic device 900, which may be a computer system, having a processing unit 920 and an HDD 910 to implement embodiments of the present general inventive concept. The present general inventive concept can be implemented with processor-based electronic products such as laptops, personal digital assistants, and mobile phones, as well as other known or later developed computer systems and/or electronic devices having an HDD or other memory device to read and/or write data without departing from the broader scope and principles of the present general inventive concept. The processing unit 920 communicates with the HDD 910 to transmit and receive data, to process the data, and to communicate with an external apparatus to receive and transmit a signal corresponding to the data. The HDD illustrated in FIGS. 1-8 can be used as the HDD 910 of FIG. 9.

According to the above-described embodiments of the present general inventive concept, the hard disk drive can reliably read and write data using a crash stop having a simple and precise structure, the actuator arm can pivot within a predetermined pivot radius, and the read/write head can be precisely located at the preset outermost position of the disk when the actuator arm contacts the crash stop.

Although a few embodiments of the present general inventive concept have been illustrated and described, the present general inventive concept is not limited to the described embodiments. Instead, it would be appreciated by those skilled in the art that changes may be made to these embodiments without departing from the principles and spirit of the general inventive concept, the scope of which is defined by the claims and their equivalents.

What is claimed is:

1. A hard disk drive, comprising:
an actuator arm to pivot across a disk about a pivot shaft and having a read/write head disposed at an end portion of the actuator arm to read data from the disk and to write data to the disk; and
a crash stop to prevent the read/write head from being pivoted beyond an outermost position of the disk, the crash stop comprising:
a housing coupled to a base of the disk drive and disposed adjacent to an outer circumference of the disk, wherein the housing includes a coupling body having a coupling groove; and
a buffer member formed of an elastic material and forcibly coupled to the housing, the buffer member including a coupling protrusion that is forcibly coupled to the coupling groove and a contact portion that extends outward from the coupling body in a first direction,
wherein the coupling body includes escape prevention portions that define an opening portion in the coupling body, and a distance between the escape prevention portions is substantially equal to a width of the contact portion and is less than a length of a longest side of the coupling protrusion.

2. The hard disk drive of claim 1 wherein the housing comprises:
a housing main body; and
a housing shaft protruding from a lower portion of the housing main body and coupled to a groove formed on the base,
wherein the coupling body extends from an upper portion of the housing main body and is forcibly coupled to the buffer member such that a part of the buffer member is exposed from the coupling body toward the actuator arm.

3. The hard disk drive of claim 2, wherein the housing is integrally formed of a plastic material by injection molding.

4. The hard disk drive of claim 2, wherein the opening portion opens toward the actuator arm and the escape prevention portions are provided at both end portions of the opening portion so as to prevent escape of the buffer member form the coupling body.

5. The hard disk drive of claim 4, wherein the buffer member is formed of rubber.

6. The hard disk drive of claim 5, wherein the buffer member comprises:
a coupling rubber portion forcibly coupled to the coupling groove of the coupling body; and
a contact rubber portion extending from the coupling rubber portion to be exposed through the opening portion of the coupling body to contact the actuator arm and to prevent the read/write head from being pivoted beyond the outermost position of the disk.

7. The hard disk drive of claim 6, wherein the contact rubber portion comprises a substantially semi-circular shape.

8. The hard disk drive of claim 6, wherein the buffer member is integrally formed by injection molding.

9. The hard disk drive of claim 7, wherein the housing and the buffer member are forcibly coupled to each other so that the center of the housing shaft and the center of an imaginary circle of the contact rubber portion are substantially matched with each other.

10. The hard disk drive of claim 7, wherein
the coupling rubber portion is substantially rectangular shaped,
a length of the longest side of the coupling rubber portion is greater than the diameter of the substantially semi-circular shaped contact rubber portion, and
the distance between the escape prevention portions is substantially equal to the diameter of the substantially semi-circular shaped contact rubber portion.

11. The hard disk drive of claim 1, wherein a contact protrusion protrudes from a side surface of the actuator arm facing the crash stop to prevent the read/write head from being deviated from a preset position of the disk when the contact protrusion contacts the buffer member.

12. The hard disk drive of claim 1, further comprising:
a board mounting plate coupled to the base; and
a flexible printed circuit board installed on the board mounting plate and electrically connected to the read/write head,
wherein the crash stop is integrally formed with the board mounting plate at a side of the board mounting plate adjacent to the outer circumference of the disk.

13. The hard disk drive of claim 1, wherein the escape prevention portions extend substantially perpendicular to the first direction.

14. The hard disk drive of claim 1, wherein the coupling protrusion is substantially rectangular shaped and the contact portion is substantially semi-circular shaped.

15. The hard disk drive of claim 14, wherein
the length of the longest side of the coupling body is greater than the diameter of the substantially semi-circular shaped contact portion, and
the distance between the escape prevention portions is substantially equal to the diameter of the substantially semi-circular shaped contact portion.

16. A crash stop assembly usable with a hard disk drive to stop an actuator arm with respect to a disk therein, the crash stop assembly comprising:
a coupling member having an opening portion facing the actuator arm; and
a buffer member having a coupling portion installed within the opening portion and a contact portion extending away from the opening portion to stop the actuator arm at a predetermined location with respect to the disk when the actuator arm contacts the buffer member,
wherein the coupling member includes escape prevention portions that define the opening portion, and a distance between the escape prevention portions is substantially equal to a width of the contact portion and is less than a length of a longest side of the coupling member.

17. The crash stop assembly of claim 16, wherein the actuator arm comprises a read/write head positioned at a predetermined location with respect to an outer circumference of the disk when the actuator arm contacts the buffer member.

18. The crash stop assembly of claim 16, further comprising:
a housing member connected to the coupling member; and
a housing shaft extending from a lower portion of the housing member to couple the housing member to a base of the hard disk drive, wherein a longitudinal center of the housing shaft substantially matches a longitudinal center of the buffer member when the housing member is coupled to the base.

19. The crash stop assembly of claim 16, wherein the coupling member is formed into a substantially ∪-shape to define the opening therein, the coupling member comprising an escape prevention portion extending from both ends of the ∪ to at least partially enclose the coupling portion within the opening portion.

20. An electronic device, comprising:
a processing unit to process data; and
a hard disk drive (HDD) connected to the processing unit to read and/or write the data, the HDD comprising a crash stop assembly to stop an actuator arm of the HDD with respect to a disk therein, the crash stop assembly comprising:
a coupling member having an opening portion facing the actuator arm; and
a buffer member having a coupling portion installed within the opening portion and a contact portion extending away from the opening portion to stop the actuator arm at a predetermined location with respect to the disk when the actuator arm contacts the buffer member,
wherein the coupling member includes escape prevention portions that define the opening portion, and a distance between the escape prevention portions is substantially equal to a width of the contact portion and is less than a length of a longest side of the coupling member.

21. The electronic device of claim 20, wherein the actuator arm comprises a read/write head positioned at a predetermined location with respect to an outer circumference of the disk when the actuator arm contacts the buffer member.

22. The electronic device of claim 20, further comprising:
a housing member connected to the coupling member; and
a housing shaft extending from a lower portion of the housing member to couple the housing member to a base of the hard disk drive, a longitudinal center of the housing shaft being substantially matched to a longitudinal center of the buffer member when the housing member is coupled to the base.

23. The electronic device of claim 20, wherein the coupling member is formed into a substantially ∪-shape to define the opening therein, the coupling member comprising an escape prevention portion extending from both ends of the ∪ to at least partially enclose the coupling portion within the opening portion.

* * * * *